July 21, 1936.  D. A. SILLERS  2,048,145
CONTACT APPARATUS AND METHOD FOR CONTACTING LIQUID AND GAS
Filed Jan. 20, 1932  3 Sheets-Sheet 1
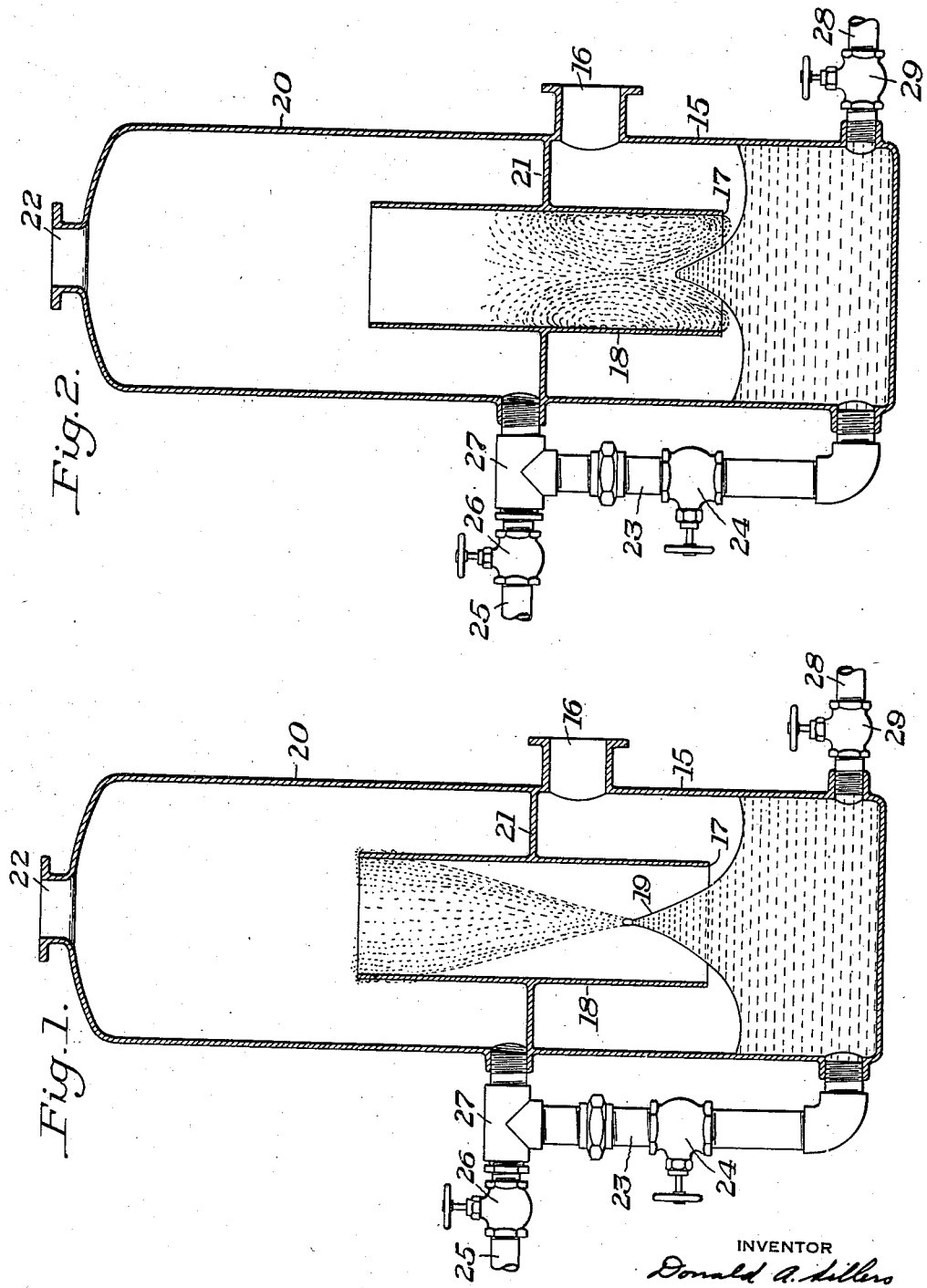
INVENTOR
Donald A. Sillers July 21, 1936. D. A. SILLERS 2,048,145
CONTACT APPARATUS AND METHOD FOR CONTACTING LIQUID AND GAS
Filed Jan. 20, 1932 3 Sheets-Sheet 2
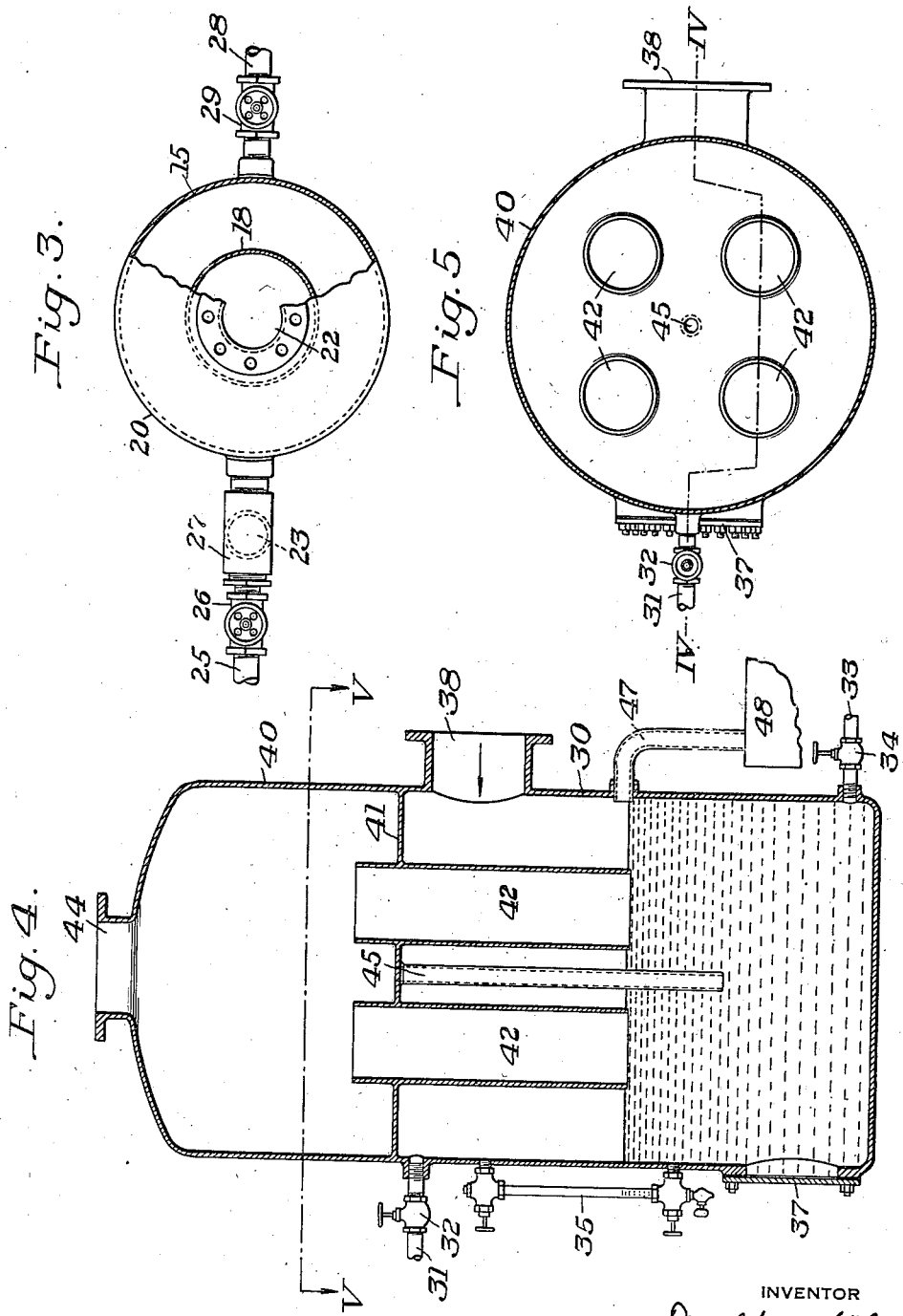

July 21, 1936.    D. A. SILLERS    2,048,145
CONTACT APPARATUS AND METHOD FOR CONTACTING LIQUID AND GAS
Filed Jan. 20, 1932    3 Sheets-Sheet 3
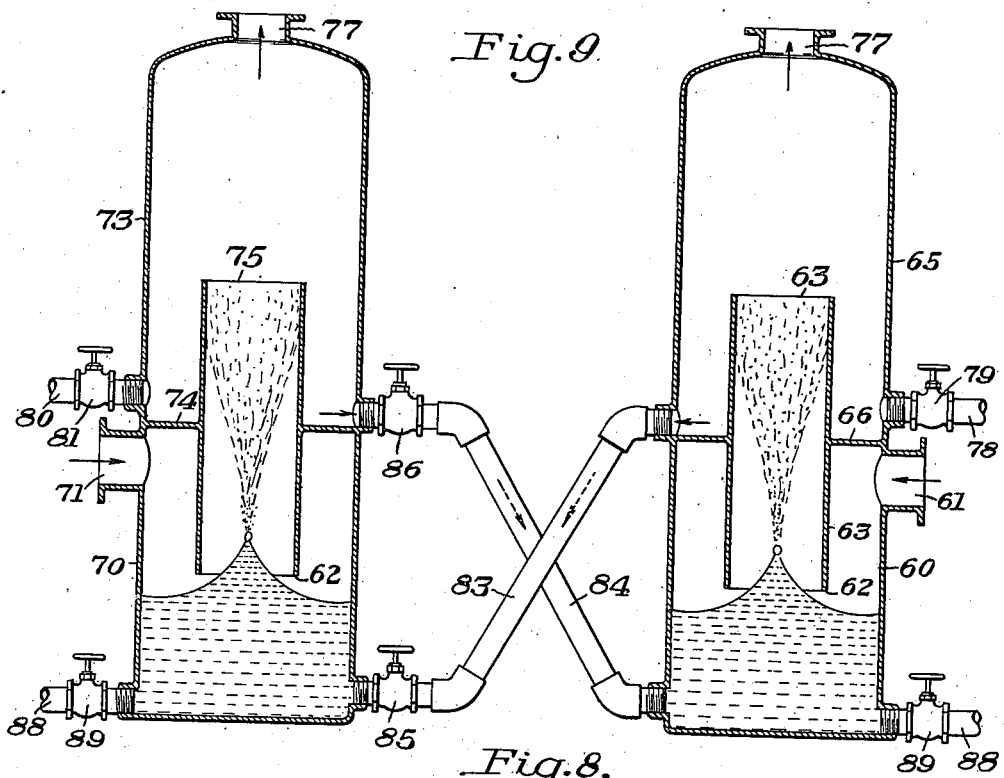
Fig. 9.
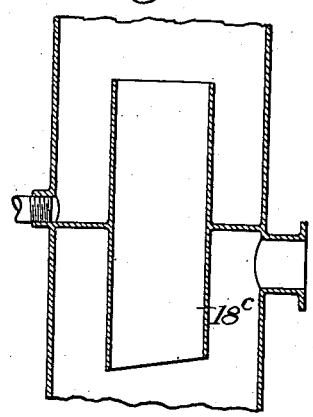
Fig. 8.
Fig. 6.
Fig. 7.
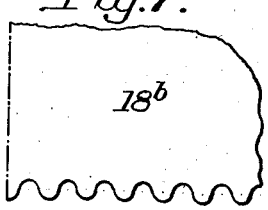
INVENTOR
Donald A. Sillers
By Byrnes, Stebbins,
Parmelee & Blenko
Attorneys Patented July 21, 1936

2,048,145

UNITED STATES PATENT OFFICE 2,048,145

CONTACT APPARATUS AND METHOD FOR CONTACTING LIQUID AND GAS

Donald A. Sillers, Dallas, Tex.

Application January 20, 1932, Serial No. 587,684

6 Claims. (Cl. 261—75)

My invention relates to an improvement in the procedure to be followed in bringing about intimate contact between a gas and a liquid, and to the principles underlying the construction of improved apparatus for effecting such contact. It has previously been customary to introduce the gas into the container for the liquid by causing the gas to pass downwardly through one or more tubes in such fashion that it impinges upon the liquid in the container, and thereafter arises around the exterior of the tubes and passes upwardly for further treatment. With this arrangement, I have found that a cumbersome construction is necessary for connecting the upper ends of the tubes to the supply of gas, this construction occupying so much of the space within the container that but a small portion of the cross-sectional area of the container is left for the upward travel of the gas after coming in contact with the liquid. When increasing the number of tubes, the size of the above-mentioned construction must be increased, thereby cutting down still further the cross-sectional area available for upward flow of the gas which has come in contact with the liquid.

In accordance with the principles of my invention, the gas is caused to pass over the surface of the liquid and discharges upwardly through a tube which extends downwardly toward the surface of the liquid. Important differences in the process follow from this fundamental change; and many results are thus made possible which could not be obtained with the old procedure.

These improved results are obtainable partly because the process accomplishes an intimate mixture of gas and liquid. Accordingly, whether the purpose is to absorb something from the gas, or whether it is to cause the gas to take up something from the liquid, the intimate mixture brought about enables the desired results to be obtained more effectively. Moreover, the gas is brought into contact with the liquid while the latter is in a finely divided state, and, therefore, the absorbing or emitting action will take place between the liquid and the gas more rapidly and more effectively.

For instance, if the gas contains particles of dust, the liquid to which such particles of dust will adhere is brought into intimate contact with the gas and effectively removes the dust from the gas. If the gas contains not merely a dust, but a mist or fog which may be described as fine drops or bubbles, there will be employed in the process a liquid of such a character as to absorb the material of which the drops or bubbles are composed.

The intimacy of the contact opens up, moreover, a wide field of usefulness for my improved process where chemical components are to be removed from or imparted to a gas. In one instance, the liquid employed will be of such character as to remove from the gas the components which it is desired to separate from the gas. On the other hand, a liquid may be employed which will impart to the gas the desired components.

A still further field of usefulness for my improved process is that of imparting heat to the gas or absorbing heat therefrom. When either of these results are desired, a liquid which is inert to the gas and which has a higher or lower temperature than the gas may be employed.

Obviously several of the objects mentioned may be attained at the same time in one piece of apparatus.

With the above purposes in mind, I have provided improved apparatus for carrying out such processes; and the principles to be followed in constructing such apparatus will be hereinafter set forth. For purposes of illustrating these principles, I have shown in the drawings certain embodiments which the same may assume; but it is to be understood that these embodiments are merely illustrative and that my invention is not limited to the specific details of such embodiments.

In the drawings,

Fig. 1 is a central vertical section through contact apparatus for liquid and gas, this figure showing diagrammatically the atomizing action of the gas flowing through the apparatus;

Fig. 2 is a view similar to Fig. 1, showing diagrammatically the action of the gas when flowing through the apparatus at a slower rate than in Fig. 1;

Fig. 3 is a plan view of the apparatus shown in Figs. 1 and 2, a part of the top of the container being broken away;

Fig. 4 is a vertical section through apparatus similar to Fig. 1, but having a plurality of tubes instead of the single tube shown in Fig. 1 (the section passes through two of the tubes, as indicated by the section line IV—IV in Fig. 5);

Fig. 5 is a horizontal section on the line V—V of Fig. 4;

Figs. 6 and 7 are developed views of the lower edges of tubes which may be used in place of the straight edge tubes illustrated in Figs. 1, 2 and 4;

Fig. 8 is a still further modification of the tube to be used in such apparatus as shown in Figs. 1, 2, and 4; and Fig. 9 is a view in central vertical section illustrating apparatus for use in bringing a liquid into contact with two separate gases.

In order to form a basis for understanding the nature of the contact between gas and liquid, a description will at this point be given of a simple form of apparatus by means of which the process may be carried out. Such apparatus is shown in Figs. 1, 2, and 3. It will be understood that this apparatus has been stripped of most accessories and represents the principles of such apparatus so simply as to be readily understood.

A liquid container 15 is provided for holding the liquid with which the gas is to be brought into contact. The gas enters through the inlet 16 which is so arranged that the gas flows into the container above the level of the liquid. In order to escape from the container 15, the gas must pass beneath a release edge, and I prefer that this release edge constitute the lower rim 17 of a tube 18. This tube is arranged substantially vertically with its rim 17 spaced away from the surface of the liquid during operation.

Should the gas flow be stopped, the liquid surface will become level, as shown in Figure 4, and it may then be somewhat above or somewhat below the release edge 17.

The gas converging from all sides around the rim 17 of the tube 18 displaces the liquid toward the center of the tube. This displacement of the liquid inwardly results in a heaping up of the same, the heap 19 tending to form into a cone but changing shape constantly due to agitation of the surface of the heap 19 by the inwardly and upwardly flowing gas. Under some conditions the heap may have the form of a narrow-waisted pillar, spreading out laterally at the top before being reduced to spray.

The gas passes on to a receiver through the tube 18. A combination form of apparatus is shown in Figs. 1, 2, and 3, and in this form of apparatus a receiver 20 is joined on to the top of the container 15. In fact, the container and receiver may be formed as a single receptacle divided by a gas-tight partition 21 through which extends the tube 18. As above pointed out, the rim 17 need not be strictly circular in shape, and it is furthermore to be understood that the tube 18 need not be provided with a cylindrical contour if it is more convenient to form the same with a different contour.

The precise shape of the heap 19 depends upon the velocity of flow of the gas and the quantity of the liquid in the container 15. If the liquid surface is close enough to the edge 17, and if the velocity of the gas be sufficient, some of the liquid is taken up by the gas passing upwardly along the surface of the heap 19, and particles are detached and carried upwardly within the tube 18 by the rising column of gas. The heap is shown in Fig. 1 as symmetrical in shape, and a drop is shown as ready to be detached from the tip of the cone. In practice, however, the heap 19 is more or less turbulent, and the drops instead of being detached from the very tip of a cone are formed in various positions near the top of the heap, the drops being blown off and atomized so that a spray impinges upon the inside of the tube 18 at various distances from the top of the cone. As above stated, if the velocity of the column of gas be sufficiently high, the particles of liquid are prevented by such velocity from running down the inside of the tube, and instead, the adherent liquid is caused to spill over the top of the tube. Moreover, certain of the particles will be blown directly into the receiver 20.

If, on the other hand, the velocity of the gas be not sufficiently high, especially if the liquid level in the container be low, a cone will be formed in the liquid, and although some particles may be carried directly upwardly through the tube 18 into the receiver 20, no liquid will be forced up along the inside of the walls of the tube 18. Such a condition is shown in Fig. 2. The drops or particles impinging upon the inside wall of the tube 18 run down and tend to drip from the lower edge.

If a sufficient amount of liquid were flowing down the inner wall of the tube 18 in this manner, and if, moreover, there were no gas flowing up inside the tube 18, a continuous film would extend from the rim 17 to the liquid in the container. Since, however, gas is flowing beneath the rim 17, the liquid that would otherwise drip down is caught by the gas and carried upwardly inside of the tube 18 until it again impinges upon the tube wall. Such liquid as is caught within the tube 18 in this way may be recirculated many times without leaving the tube, being alternately reduced to fine spray and caught on the walls of the tube. Thus, the tube would, under these conditions, be an efficient means of securing intimate contact between the gas and the liquid.

Fig. 1 shows a limiting condition in which no liquid is running back down the inside of the tube 18, while Fig. 2 shows the other limiting condition in which no liquid is being picked up by the ascending column of gas and carried over the top of the tube. In actual practice, the apparatus may operate at such gas velocities and liquid levels that both of these processes take place at the same time to some degree, some liquid running down the inside of the tube, while other liquid is carried through and over the top of the tube. It is possible, however, to so control the velocity of flow of the gas and the level of the liquid relative to the rim 17 that either process may preponderate over the other. It has been discovered that one process is useful for certain purposes and the other process is useful for other purposes.

Thus, where it is desirable to atomize the liquid to a greater extent, without bodily entraining any substantial amount of liquid with the gas, the liquid level may be slightly raised and the gas velocity made insufficient to carry any considerable amount of liquid up through the tube 18. By lowering the level of the liquid in the container 15, the degree to which the liquid is agitated is reduced, and there is a lessened tendency for the liquid to become atomized. On the other hand, with the liquid level arranged so as to tend to effect atomizing to substantially the same degree, an increase in the rate of flow of the gas increases the extent to which the atomized liquid is carried upward with the gas.

Such liquid as is forced over the upper rim of the tube 18 is caught in the sump formed by the partition 21. Moreover, if desired, devices may be used either in the receiver 20 or in the conduit conveying the gas away from the outlet 22 of the receiver 20, which will be effective to abstract the liquid particles to a greater or less extent from the gas and return the liquid thus collected to the sump at the bottom of the receiver 20. Pumping systems, cooling systems, cleansing systems and the like, which may be used for treatment of the liquid either before or after it has passed through the container 15 may, if desired, be used in connection with the apparatus shown. Such devices are well known in the art and are not shown in the drawings; since the particular application of my invention will dictate the accessory devices which should be employed in connection with such container.

As the simplest manner of illustrating the invention, I have shown in Figs. 1 and 2 a by-pass 23 for returning liquid collecting in the sump to the container 15. As shown in Figs. 1 and 2, a valve 24 may be provided for controlling the flow of liquid through the by-pass 23. By properly setting the valve 24, it is possible to prevent the liquid rising above a predetermined level in the container 15, so long as the rate of flow through the tube 18 does not vary too widely. In other words, when the level of the liquids tends to rise, a greater amount of liquid is atomized and carried upwardly through the tube 18 by the escaping gas. As the level drops down again the atomizing action decreases and there is a tendency for stabilizing of the liquid level.

The apparatus may be arranged either to circulate liquid in the manner just described, so as to use the same liquid over and over again, or the apparatus may be arranged to pass fresh liquid continually into and out of the container 15 at any desired rate. For this purpose, I provide an inlet 25 controlled by a valve 26 whereby liquid may be introduced through a T 27 into the by-pass 23. The discharge 28 from the container 15 is controlled by a valve 29. If a regulated flow of liquid be passed through the apparatus by adjusting valves 26 and 28, and if the valve 24 be open, the incoming liquid will mingle with any liquid which may have passed upwardly through the tube 18 and is returning through the by-pass. If, however, the valve 24 be closed, the incoming liquid will accumulate in the container above the diaphragm 21 until it overflows the top of the tube 18.

On the other hand, the direction of flow may be reversed by introducing the liquid through the valve 28 and drawing it off through the valve 26, with valve 24 either open or closed.

While my invention is not limited to a specific application of the broad principles above set forth, I have found these principles to have particular advantage in certain relations. In cleaning dust or undesirable ingredients from gas, the gas will be passed in through the inlet 16 and caused to converge so as to discharge by passing beneath the rim 17 and upwardly through the tube 18. Oil or a suitable cleaning liquid is supplied to the container 15, and the gas is passed through the apparatus at such velocity as to cause particles of oil to be thrown upwardly from the heap 19. The degree to which the oil is broken up into particles may be controlled by controlling the quantity of liquid in the container 15. Any dust in the gas will adhere to the particles of oil which scatter themselves throughout the cross-section of the tube 18, and these particles remain with the oil, the cleaned gas passing out through the discharge 22. Inasmuch as the particles of solid matter cleaned out of the gas tend to collect a sediment in the bottom of the container 15, a cleaning-out opening similar to the one shown in Fig. 4 is preferably provided.

Where it is desired to enrich a gas, as in the case of illuminating gas a hydrocarbon oil is supplied to the container 15. The velocity of the gas is made high enough so as to form a spray of finely divided oil within the tube 18. In this manner a carburization of the gas in a highly effective manner is brought about.

Where gas is contaminated by an ingredient or ingredients which the manufacturer desires to remove before sale to consumers, the gas may be treated with a liquid for separating out the ingredient or ingredients. The velocity of the gas and the quantity of the liquid in the container 15 are preferably maintained sufficiently high so that a thorough atomizing of the liquid within the tube 18 is brought about. If the liquid has been properly selected, the particles sprayed upwardly within the tube 18 collect practically all of the impurities in the gas, and the treating liquid may be removed, leaving the gas in a purified state. The liquid containing the impurities collects within the sump, and the gas is conveyed away for use.

It may now be pointed out that the greater the velocity of gas flow where the gas is in contact with the liquid beneath the release edge 17, the greater the quantity of liquid that will be picked up by the gas. With a given quantity of gas flow per minute, the velocity will depend upon the clearance between the release edge and the liquid surface, and this in turn, depends partly upon th quantity of liquid in the container 15. Therefore, by regulating the quantity of liquid in 15, I may, within certain limits, regulate the maximum velocity of gas around the edge, and thereby the amount of liquid entrained. I wish to point out, however, that when approximately the proper quantity of liquid has been introduced into 15, the apparatus as shown is largely self-regulating, as the surface 19 of the liquid tends to adjust itself to the gas flow. Moreover, when the volume of gas passing through the apparatus increases greatly, more liquid is carried through the tube and accumulates above the diaphragm 21, whence it can flow back only through the by-pass 23, regulated by the valve 24.

If, therefore, the valve 24 be set so as to permit return flow of only a certain quantity of liquid, the total quantity of liquid in the container including all above the diaphragm, as well as all below it, will automatically become divided into two portions,—one below 21 and the other above it, such that the circulation through the by-pass will be constant. It is obvious that such a condition may be produced without the regulating valve 24, if the pipes are made the proper sizes for given conditions.

The apparatus which I provide is not only self-regulating in the manner above described. It is further self-regulating in that the liquid picked up is substantially proportional in quantity to the amount of gas passing through the device. This is true in view of the fact that as the velocity of the gas increases, and consequently, the quantity of gas increases, the amount of liquid picked up will also increase. This increase will, as stated above, be roughly proportional to the amount of gas passing through the device.

While Figures 1, 2, and 3, which show a single tube 18 within a container, illustrate the principle of the invention; in practice I prefer to employ a number of tubes, as indicated in Figures 4 and 5, because by doing so I can get a greater total length of release edge in proportion to the cross-sectional area of the inside of the tube, and better adapt the apparatus to specific technical uses.

In Figures 4 and 5, there is disclosed apparatus comprising a container 30 for the liquid, to which such liquid may be supplied through an inlet pipe 31 under the control of a valve 32. The liquid may be discharged or drawn off through an outlet pipe 33 which is controlled by a valve 34. A gage glass 35 is provided for indicating the height of the liquid in the container 30. As solid impurities tend to collect as a sludge in the bottom of the container 30, I provide a clean-out opening 37 adjacent the bottom of the container 30.

The arrangement for conveying gas to and from the container 30 is similar to that shown in Figs. 1 and 2. I provide an inlet 38 for the gas; and above the container 30 I provide a receiver 40 which may be formed integrally with the container 30, being separated therefrom by a gas-tight partition 41. A plurality of tubes 42 extend through the partition 41, each extending downwardly towards or dipping slightly below the normal liquid level in the container when not in operation. In principle, this form of apparatus operates in the same manner as the apparatus shown in Figs. 1 and 2. The gas entering at 38 flows over the surface of the liquid and converges about the several tubes 42. A heap of liquid is formed within each tube by the gas passing inwardly under the lower rim of the same, and if the velocity of flow of the gas is sufficiently high, particles of the liquid are carried upwardly into the receiver 40. The gas passes out through the outlet 44, while the liquid which collects in the sump in the bottom of the receiver is returned to the body of liquid in the container 30 by a discharge pipe 45 which extends a sufficient distance below the level of the liquid to ensure that no gas shall pass upwardly therethrough to cause a back flow of liquid up this pipe. This pipe 45 may be made of such cross-section as to return liquid to the container 30 at a predetermined rate, and thus controls the circulation of liquid in the apparatus.

The level of the liquid in the container 30 may be controlled by causing liquid to flow continuously in through the inlet 31 and out through the outlet 33 under control of the valves 32 and 34. Where the liquid is substantially all recirculated, the level of the liquid may be prevented from rising too high by an over-flow pipe 47 leading to a reservoir 48. One advantage of the use of such an overflow is that dirt washed out of the gas accumulates at the bottom of the container 30, thus tending to cause the level of the liquid to rise. The overflow pipe 47 takes care of this excess liquid, and the amount flowing over into the reservoir indicates the quantity of dirt which has been trapped in the container 30. This overflow pipe may be employed as a safety factor, even when liquid is being continuously supplied to the container through the inlet 31.

The use of a plurality of tubes in a single container is more economical than the use of a large number of separate containers each having its own tube. The use of large tubes requires an excessive velocity in order to cause the formation of such a heap within the circle of the release surface as will result in proper atomizing of the liquid. A large volume of gas can be passed through the apparatus shown in Fig. 4, since with a plurality of tubes, the volume of flow through each is relatively small and the diameter of each individual tube may be restricted to the most efficient size.

Moreover, it is possible to provide removable stops for some of the tubes, to close some of them off when the gas flow is reduced, while maintaining the velocity of flow in others. The factors most readily controlled which bear on the operation of atomizing the liquid so as to effect an intimate contact between liquid and gas are the liquid level and the gas velocity. The length of the tube, 18 or 42 as the case may be, has a bearing on the quantity of liquid carried up through the tube by the rising column of gas. If it is desired to recirculate the particles of liquid within the tube so as to bring the same liquid again and again into contact with the gas, a long tube may be employed. Where dust or certain ingredients are being separated from the gas, it may be found desirable to cause a large proportion of the particles to be carried up over the top rim of the pipe and into the sump. In such case, the length of the tube should be shortened so as to facilitate the entraining of the particles upwardly with the gas so as to cause the liquid carrying the impurities to collect in the sump.

The character of the liquid and the diameter of the tube also control, to a certain extent, the length of the tube. If the liquid is heavy and has high surface tension, it will not be picked up as readily as if it were light and had low surface tension. With a heavy liquid, the velocity necessary to thoroughly atomize the same will be much greater with a given diameter of tube, and moreover, the tube must be considerably shortened if a substantial amount of liquid is to be carried up completely through the tube.

I have also discovered that the best velocity of gas is affected by the shape of the bottom edge of the tube. In Figs. 1, 2, and 4, the bottom edges of the tubes are shown as cut off even all around. For certain types of liquid and for certain velocities of gas, it is preferable to use a different edge. In Fig. 6, I have shown a developed view of a serrated edge which I have found to have advantages under certain conditions. The serrations may be inclined to give the gas a rotary or vortex motion as it enters the tube. Moreover, a scalloped edge of the type shown in Fig. 7 may have advantages for certain conditions of gas flow or certain types of liquid. It may even be found advantageous to use an edge of the type shown in Fig. 8, this edge being inclined to the horizontal so that the release surface on one side requires less pressure differential than the other side to force gas underneath the same. Each of these types of release surface will be found to have peculiar advantages of its own.

My improved process readily adapts itself to the treatment of two separate streams of gas with liquid. The gas passing over the surface of a body of the liquid is caused to converge and flow upwardly through a discharge conduit by first passing beneath a release surface in the manner set forth in connection with Fig. 1. The rate at which the gas passes beneath the release surface is maintained high enough to cause particles of liquid to be entrained with the gas flowing upwardly through the conduit, and these particles of liquid thus entrained are collected and discharged into a second body of the liquid. The same procedure is carried out with this second body of liquid, except that the second of the two streams of gas is caused to flow over the surface of the liquid and beneath the release surface.

In Fig. 9, I have shown a pair of devices similar to the one shown in Fig. 1, these devices being connected with one another in such fashion as to cause liquid to circulate from one to the other. The first gas enters a liquid container 60 through an inlet 61 and converges about the rim 62 of a tube 63. The container 60 is surmounted by a receiver 65 similarly as in the apparatus shown in Fig. 1, and the tube 63 extends through a gas-tight partition 66, this partition forming a sump in which the liquid particles entrained with the gas may collect. A similar device is provided for treating the second stream of gas, this gas entering a container 70 through an inlet 71. Above the container 70 is a receiver 73 which is separated from the container 70 by a gas-tight partition 74. A tube 75 extends through the partition in similar fashion as in the first device. Each device is provided with a gas outlet 77.

The liquid may be supplied either to the sump above the partition 66 or to the sump above the partition 74. In the first case, the liquid is admitted through an inlet 78 by opening a valve 79. In the second case, the liquid is admitted through an inlet 80 by opening a valve 81. The liquid thus admitted, or which may pass over the top of the tube 63 or 75, flows from the sump through a connecting pipe 83 or 84, as the case may be, into the corresponding container 70 or 60. Flow through the pipes 83 and 84 is controlled respectively by valves 85 and 86. By means of these valves, the rate at which liquid flows into each container may be controlled, and in this fashion, the quantity of liquid atomized within each tube may be controlled. When desired, the liquid may be withdrawn from the containers through discharge pipes 88 by opening either or both of the valves 89. Normally, however, the liquid circulates from one device to the other, and is used for treating first one stream of gas and then the other.

It is thus possible to extract a certain constituent or impurity from one stream of gas and then pass the liquid into the other container through which a gas is being passed for acting in a desired manner upon the impurity removed from the first gas. The liquid circulating between the two containers will thus be subjected to one sort of chemical or physical reaction with the first gas, and to another sort of chemical or physical reaction with the second stream of gas. This procedure which enables contact between a liquid and gases in two different steps has possibilities which will be readily appreciated by those skilled in the art. The device has the further advantage that there is no need for a pump or other means for circulating the liquid, other than the normal devices such as the pipes 78 and 80 and valves 79 and 81 for supplying the liquid to the sumps.

In describing the principles of my invention, I have pointed out certain processes which I have described in detail so as to make clear my improvement in bringing about intimate contact between gas and liquid. Moreover, in setting forth these processes, I have referred to specific forms of apparatus which may advantageously be employed in connection with the same. It will be understood, however, that my invention is not limited to the details of the specific processes described, nor to the exact arrangement or construction of the apparatus shown in the drawings. The procedure in bringing about such intimate contact is quite flexible, since the behavior of the liquid in a container varies with changes in the character of the liquid or of the gas, and may be quite readily controlled by controlling the velocity of the flow of the gas or the amount of liquid in the container, or both the velocity and the quantity of liquid. It is thus possible to bring about a very nice adjustment by controlling the quantity of liquid in the container and varying the velocity of flow of the gas so as to obtain the best results. Moreover, where the velocity of the gas is kept low enough, the spraying of the particles of liquid is limited so that substantially all of the sprayed liquid is caught on the walls of the tube where the liquid will run down and tend to drip back into the container. The drippings from the lower rim of the tube will tend to spray upwardly onto the walls again, and this recirculation of the liquid is particularly advantageous where it is desired to thoroughly mix a liquid and gas.

In addition to the valves for controlling the liquid level, the apparatus is supplied with devices such as the gage glass 35 for determining accurately whether the operation is normal or otherwise. Accordingly, a close check on the extent to which atomizing is taking place is possible, and the desired treatment may be carried out. For instance, a certain amount of liquid may be introduced and retained until it is all absorbed by the gas. On the other hand, instead of giving up ingredients to the gas, the liquid may be used to absorb ingredients from the gas. When the usefulness of the liquid has been exhausted or reduced, all of the liquid in the container may then be changed. Then again for continuous operation, a steady stream of liquid may be caused to flow through the apparatus, such flow being regulated at such speed as is properly adapted to the continuous process desired. Further advantages of my improved process and apparatus have been above pointed out, and will be more particularly referred to in the appended claims.

I claim:

1. Contact apparatus for liquid and gas comprising in combination a liquid container, a tube extending downwardly into the container to a point adjacent the surface of the liquid in the container, a receiver into which the upper end of the tube discharges, means for passing gas into said container above the liquid level and upwardly through the tube into said receiver, a by-pass for returning to the container liquid entrained by the gas passing upwardly into the receiver, and a valve controlling the return flow of liquid through said by-pass.

2. Contact apparatus comprising in combination, a liquid container, and means for passing gas over the surface of liquid in the container and discharging the gas from the container including a tube extending downwardly into the container to a point adjacent the surface of the liquid in the container, said tube having at least a portion of its lower edge inclined relative to the horizontal.

3. Contact apparatus for bringing a liquid into intimate contact with two separate gases comprising a liquid container, means for passing gas over the surface of the liquid in said container and discharging the gas from the container including a tube extending downwardly into said container to a point adjacent the surface of the liquid in the container, a second liquid container, means for collecting liquid entrained by the gas passing upwardly through said tube, means for delivering the liquid thus collected to the second container, and means for passing the second gas over the surface of the liquid in the second container and discharging the gas from said second container including a tube extending downwardly into the container to a point adjacent the surface of the liquid in the container.

4. Contact apparatus for bringing a liquid into intimate contact with two separate gases comprising a liquid container, means for passing one of the gases over the surface of the liquid in said container and discharging the gas from the container including a tube extending downwardly into said container to a point adjacent the surface of the liquid in the container, a second liquid container, means for collecting liquid entrained by the gas passing upwardly through said tube, means for delivering the liquid thus collected to the second container, means for passing the second gas over the surface of the liquid in the second container and discharging the gas from said second container including a tube extending downwardly into the container to a point adjacent the surface of the liquid in the container, means for collecting the liquid entrained by the second gas passing upwardly through said second mentioned tube, and means for returning the liquid thus collected to the first-mentioned container.

5. The process of bringing gas and liquid into intimate contact with each other, comprising passing the gas over the surface of the liquid, causing it to converge and pass sufficiently rapidly both beneath a release edge adjacent the surface of the liquid and upwardly through a confined passageway to raise a heap of liquid within an area defined by said release edge and atomize a portion thereof, and substantially continuously supplying liquid to said body of liquid.

6. Contact apparatus for liquid and gas comprising a liquid container, a conduit extending downwardly into the container to a point adjacent the surface of the liquid in the container, a receiver into which the upper end of said tube discharges, means for passing gas into said container above the liquid level therein, the cross sectional area of said conduit being sufficiently small relative to the cross sectional area of the container and the gas pressures in the container and receiver to cause the gas to flow past the lower edge of the conduit and upwardly therethrough at velocities sufficient to raise a heap of liquid within an area defined by said conduit and atomize a portion thereof as it passes upwardly through the conduit, and means for maintaining the liquid level in said container substantially constant.

DONALD A. SILLERS.